US011709480B2

(12) United States Patent
Moorhouse et al.

(10) Patent No.: US 11,709,480 B2
(45) Date of Patent: Jul. 25, 2023

(54) SYSTEM AND METHOD FOR AUTOMATIC DATA CLASSIFICATION FOR USE WITH DATA COLLECTION SYSTEM AND PROCESS CONTROL SYSTEM

(71) Applicant: Honeywell International Inc., Morris Plains, NJ (US)

(72) Inventors: James Edward Moorhouse, Milford, OH (US); Andrew Duca, Phoenix, AZ (US); Seth G. Carpenter, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 232 days.

(21) Appl. No.: 15/978,962

(22) Filed: May 14, 2018

(65) Prior Publication Data

US 2019/0346833 A1 Nov. 14, 2019

(51) Int. Cl.
*G05B 19/418* (2006.01)
*G06Q 10/0631* (2023.01)
(Continued)

(52) U.S. Cl.
CPC ....... *G05B 19/4183* (2013.01); *G06F 16/903* (2019.01); *G06F 18/24* (2023.01); *G06F 18/40* (2023.01); *G06Q 10/0631* (2013.01)

(58) Field of Classification Search
CPC ...... G06F 9/5027; G06F 3/012; G06F 21/577; G05B 19/4184; G05B 19/4183; G06K 9/6253; G06K 9/6267; G06Q 10/0631
See application file for complete search history.

(56) References Cited

U.S. PATENT DOCUMENTS 6,941,557 B1 9/2005 Jakobson et al.
7,539,724 B1 5/2009 Callaghan
(Continued)

FOREIGN PATENT DOCUMENTS

JP 2013038601 A 2/2013
KR 10-2003-0021537 A 3/2003
(Continued)

OTHER PUBLICATIONS

Product Overview, "WIN-911," Jan. 13, 2015, 2 pgs.
(Continued)

*Primary Examiner* — Mariela Reyes
*Assistant Examiner* — Courtney Harmon
(74) *Attorney, Agent, or Firm* — Ortiz & Lopez, PLLC; Luis M. Ortiz; Kermit D. Lopez

(57) ABSTRACT

A method includes accessing, from a data store, at least one predefined data classification for asset data associated with multiple assets in an industrial process control system, wherein the at least one predefined data classification is associated with one or more first policies, wherein the data store stores a plurality of data classifications for asset data. The method also includes receiving user input of a customization to the at least one predefined data classification to generate at least one customized data classification associated with one or more second policies. The method further includes storing the at least one customized data classification in the data store. The method also includes collecting asset data from at least one of the multiple assets. The method further includes processing the collected asset data according to the one or more second policies associated with the at least one customized data classification.

20 Claims, 3 Drawing Sheets

(51) Int. Cl.
  *G06F 16/903* (2019.01)
  *G06F 18/24* (2023.01)
  *G06F 18/40* (2023.01)

(56) References Cited

U.S. PATENT DOCUMENTS

| | | | |
|---|---|---|---|
| 10,021,063 | B2 | 7/2018 | Duca |
| 10,021,064 | B2 | 7/2018 | Duca et al. |
| 10,078,326 | B2 | 9/2018 | Duca et al. |
| 11,323,327 | B1* | 5/2022 | Chitalia ............... H04L 41/0893 |
| 2003/0200304 | A1 | 10/2003 | Thorpe et al. |
| 2004/0128374 | A1 | 7/2004 | Hodges et al. |
| 2007/0297557 | A1 | 12/2007 | Kuwatani |
| 2010/0082133 | A1 | 4/2010 | Chouinard et al. |
| 2010/0106528 | A1 | 4/2010 | Brackett et al. |
| 2011/0040399 | A1 | 2/2011 | Lu |
| 2011/0276165 | A1 | 11/2011 | Ko et al. |
| 2012/0029678 | A1 | 2/2012 | McGreevy et al. |
| 2012/0079282 | A1 | 3/2012 | Lowenstein et al. |
| 2012/0210158 | A1* | 8/2012 | Akiyama ................ G06F 11/07 714/2 |
| 2013/0061046 | A1 | 3/2013 | Joy et al. |
| 2013/0212186 | A1 | 8/2013 | Camp et al. |
| 2014/0047107 | A1 | 2/2014 | Maturana et al. |
| 2014/0121789 | A1 | 5/2014 | Brandes et al. |
| 2014/0195643 | A1 | 7/2014 | Liu et al. |
| 2014/0344369 | A1 | 11/2014 | Goldberg et al. |
| 2015/0007265 | A1 | 1/2015 | Aissi et al. |
| 2015/0077263 | A1 | 3/2015 | Ali et al. |
| 2016/0225059 | A1 | 8/2016 | Chow |
| 2016/0334770 | A1 | 11/2016 | Laycock et al. |
| 2016/0334825 | A1* | 11/2016 | Nesler ................... G05B 15/02 |
| 2016/0335373 | A1 | 11/2016 | Burd et al. |
| 2016/0335858 | A1 | 11/2016 | Burd et al. |
| 2016/0337166 | A1 | 11/2016 | Duca et al. |
| 2016/0349726 | A1 | 12/2016 | Srinivasan et al. |
| 2017/0033984 | A1* | 2/2017 | Lear ..................... H04L 41/0893 |
| 2017/0214717 | A1* | 7/2017 | Bush ................... G05B 19/0426 |
| 2018/0013633 | A1* | 1/2018 | Daijavad ............ H04L 41/5054 |
| 2018/0239341 | A1 | 8/2018 | Moorhouse et al. |

FOREIGN PATENT DOCUMENTS

| | | |
|---|---|---|
| KR | 10-1077591 B1 | 10/2011 |
| KR | 10-2012-0087235 A | 8/2012 |
| KR | 10-2013-0006760 A | 1/2013 |
| KR | 10-2014-0059788 A | 5/2014 |
| KR | 10-2014-0103859 A | 8/2014 |

OTHER PUBLICATIONS

Product Overview, "WIN-911 Enterprise Edition," Feb. 27, 2014, 2 pgs.
Product Data Sheet, "Mobile-911," Sep. 25, 2015, 2 pgs.
Specter Instruments, "WIN-911/Lite," Jan. 2005, 2 pgs.
Product Overview, "WIN-911 Version 7," Feb. 11, 2014, 2 pgs.
Specter Instruments, "WEB-911 XTools," Jan. 26, 2009, 1 pg.
Technical Brief, "WIN-911 Version 7.17.00, Changes and Enhancements: General WIN-911: V6.18 to V7.17.00," Sep. 10, 2015, 15 pgs.
User's Manual, "WIN-911 V7.12," Oct. 11, 2011, 582 pgs.
International Search Report and Written Opinion of the International Searching Authority dated Jul. 28, 2016 in connection with International Patent Application No. PCT/US2016/029953, 10 pages.
International Search Report and Written Opinion of the International Searching Authority dated Aug. 9, 2016 in connection with International Patent Application No. PCT/US2016/029758, 11 pages.
International Search Report and Written Opinion of the International Searching Authority dated Jul. 28, 2016 in connection with International Patent Application No. PCT/US2016/030012, 12 pages.
International Search Report and Written Opinion of the International Searching Authority dated Jul. 28, 2016 in connection with International Patent Application No. PCT/US2016/030037, 8 pages.
International Search Report and Written Opinion of the International Searching Authority dated Aug. 9, 2016 in connection with International Patent Application No. PCT/US2016/030377, 11 pages.
International Search Report and Written Opinion of the International Searching Authority dated Jul. 28, 2016 in connection with International Patent Application No. PCT/US2016/029984, 13 pages.
International Search Report and Written Opinion of the International Searching Authority dated May 17, 2018 in connection with International Application No. PCT/US2018/018195, 11 pages.

* cited by examiner

SYSTEM AND METHOD FOR AUTOMATIC DATA CLASSIFICATION FOR USE WITH DATA COLLECTION SYSTEM AND PROCESS CONTROL SYSTEM

TECHNICAL FIELD

This disclosure relates generally to industrial process control and automation systems. More specifically, this disclosure relates to a system and method for automatic data classification for use with a data collection system and an industrial process control and automation system.

BACKGROUND

Large-scale systems, such as industrial process control and automation systems, often include hundreds or thousands of system assets like computers, sensors, actuators, and controllers. In order to ensure that such large systems are performing optimally, it is beneficial to regularly monitor the health and performance of system assets, such as by using a health and performance monitoring system. When installing a new monitoring system, several weeks of effort may be required to fully configure the system for data collection. For example, such systems can require considerable time by site experts to identify the assets to be monitored. In addition, when installing and collecting data from on-premises systems (including OEM systems), existing solutions require the installer to explicitly specify the classification and provide other contexts to the identified assets. This requires considerable human effort and often results in numerous data entry errors and added costs.

SUMMARY

This disclosure provides a system and method for automatic data classification for use with a data collection system and an industrial process control and automation system.

In a first embodiment, a method includes accessing, by at least one processing device from a data store, at least one predefined data classification for asset data associated with multiple assets in an industrial process control system, wherein the at least one predefined data classification is associated with one or more first policies, wherein the data store stores a plurality of data classifications for asset data. The method also includes receiving, by the at least one processing device, user input of a customization to the at least one predefined data classification to generate at least one customized data classification associated with one or more second policies. The method also includes storing, by the at least one processing device, the at least one customized data classification in the data store. The method also includes collecting, by the at least one processing device, asset data from at least one of the multiple assets. The method also includes processing, by the at least one processing device, the collected asset data according to the one or more second policies associated with the at least one customized data classification.

In a second embodiment, an apparatus includes at least one processing device. The at least one processing device is configured to access, from a data store, at least one predefined data classification for asset data associated with multiple assets in an industrial process control system, wherein the at least one predefined data classification is associated with one or more first policies, wherein the data store stores a plurality of data classifications for asset data. The at least one processing device is also configured to receive user input of a customization to the at least one predefined data classification to generate at least one customized data classification associated with one or more second policies. The at least one processing device is also configured to store the at least one customized data classification in the data store. The at least one processing device is also configured to collect asset data from at least one of the multiple assets. The at least one processing device is also configured to process the collected asset data according to the one or more second policies associated with the at least one customized data classification.

In a third embodiment, a non-transitory computer readable medium contains instructions that, when executed by at least one processing device, cause the at least one processing device to access, from a data store, at least one predefined data classification for asset data associated with multiple assets in an industrial process control system, wherein the at least one predefined data classification is associated with one or more first policies, wherein the data store stores a plurality of data classifications for asset data; receive user input of a customization to the at least one predefined data classification to generate at least one customized data classification associated with one or more second policies; store the at least one customized data classification in the data store; collect asset data from at least one of the multiple assets; and process the collected asset data according to the one or more second policies associated with the at least one customized data classification.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures discussed below and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
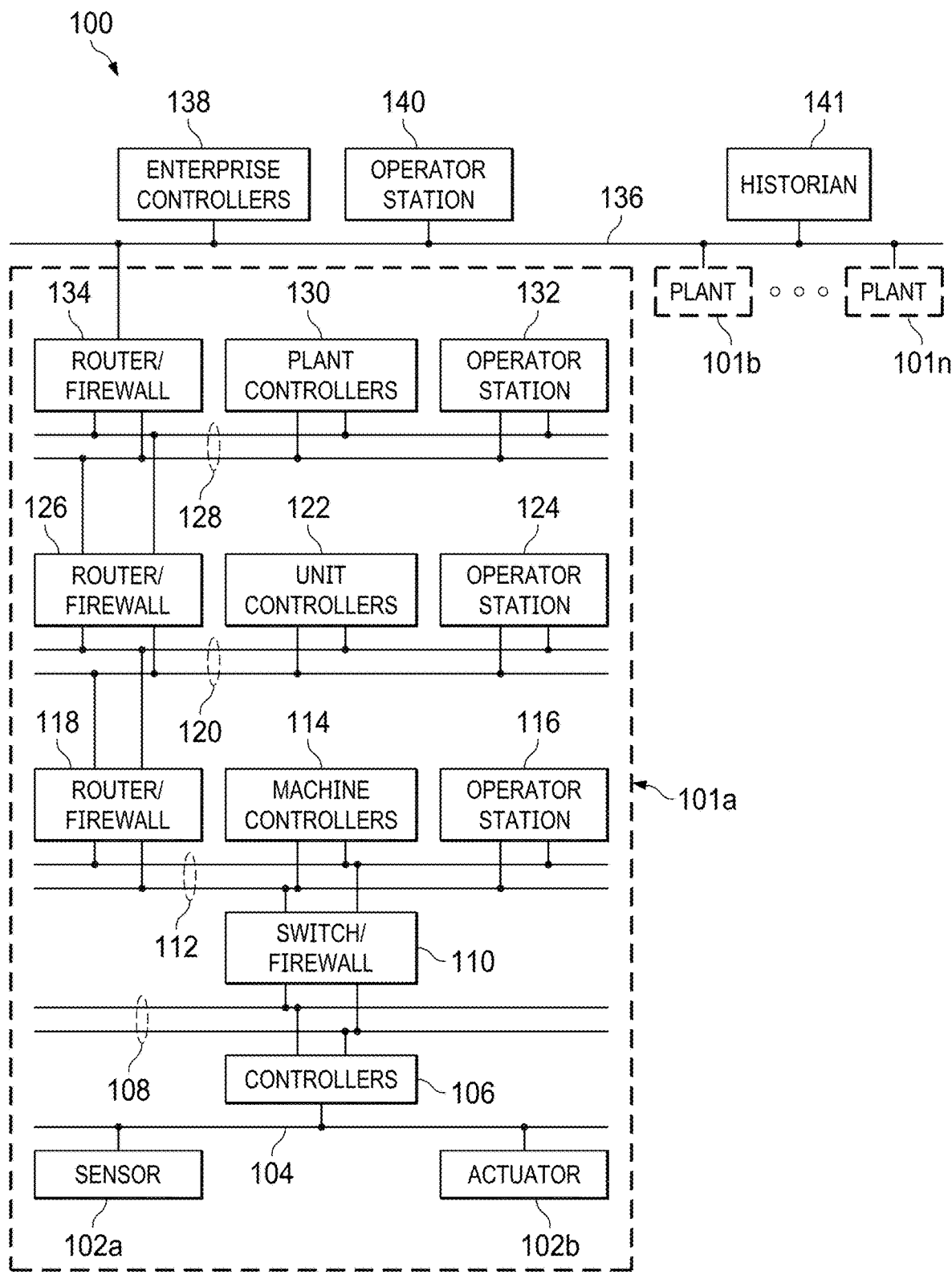
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Additionally or alternatively, each controller 122 could represent a multivariable controller, such as a HONEYWELL C300 controller. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers and operator stations could include one or more processing devices and one or more memories for storing instructions and data used, generated, or collected by the processing device(s). Each of the controllers and operator stations could also include at least one network interface, such as one or more Ethernet interfaces or wireless transceivers.

As described in more detail below, various components in the system 100 could be designed or modified to operate in conjunction with a data collection system and schedule for monitoring of the system 100. In addition, one or more components of the system 100 could be configured to perform automatic data classification for use with such a data collection system. For example, one or more of the operator stations 116, 124, 132, 140 or the historian 141 could be configured to automatically classify asset related data (e.g., asset health or performance information) that is then collected and processed by a data collection system according to a collection schedule.

Although FIG. 1 illustrates one example of an industrial process control and automation system 100, various changes may be made to FIG. 1. For example, the system 100 could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where data associated with a data collection system can be automatically classified. This functionality can be used in any other suitable system, and the system need not be related to industrial process control and automation.

Figure 2:
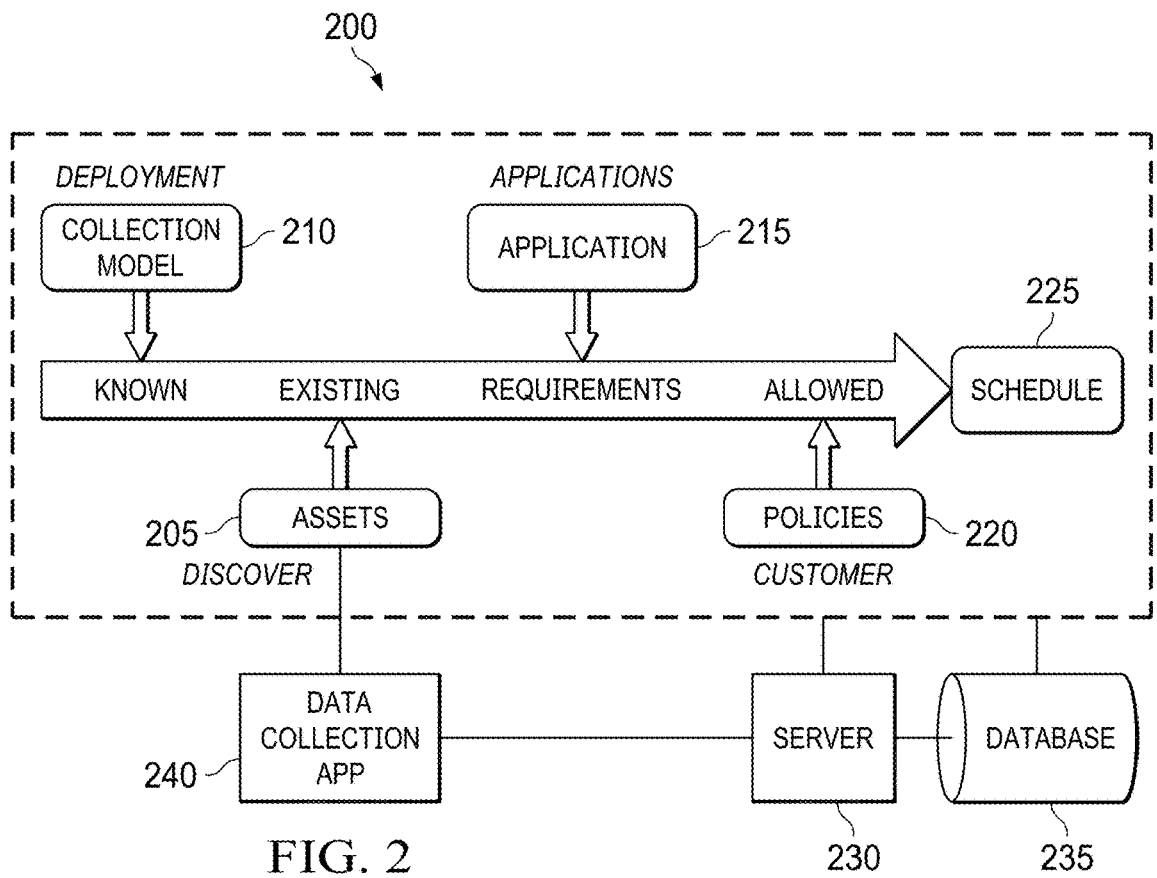
FIG. 2 illustrates an example framework for automatic configuration of a data collection system and schedule for control system monitoring according to this disclosure.

FIG. 2 illustrates an example framework 200 for automatic configuration of a data collection system and schedule for control system monitoring according to this disclosure. The framework 200 could, for example, be used for configuring a system that monitors components in the system 100 of FIG. 1. However, the framework 200 could be used with any other suitable system. In some embodiments, the framework 200 is similar to, or the same as, a framework described in the Applicant's co-pending patent application U.S. Ser. No. 15/436,130, the contents of which are incorporated herein by reference.

As shown in FIG. 2, the framework 200 includes a number of input components, including assets 205, a collection model 210, applications 215, and policies 220. Using these components 205-220 as input sources, the framework 200 can be used to generate a schedule 225 for collection of data for monitoring the assets of a control system. In some embodiments, a computing device 230, such as a server, can use the framework 200 to generate the schedule 225.

The assets 205 represent one or more assets for which health and performance data can be collected. The assets 205 may be referred to as residing in a "collection environment." Typically, the assets 205 in the collection environment correspond to various assets that make up all or a portion of a process control system or another type of system. For example, some or all of the assets 205 may represent, or be represented by, various components of the system 100 in FIG. 1, such as any of the sensors 102a, actuators 102b, controllers 106, 114, 122, 130, 138, or operator stations 116, 124, 132, 140. In some cases, the assets 205 correspond to assets that exist or are installed at one or more plant sites.

The collection model 210 represents a data model defining asset attributes that are known how to collect. These asset attributes can be referred to as "collection parameters." The collection parameters can be arranged and categorized according to asset type in the model 210. For example, if an asset 205 is a MICROSOFT WINDOWS-based computer, there are hundreds of known performance indicators, such as central processing unit (CPU) utilization, memory utilization, and disk read time, that can be read and hundreds of registry entries that can be accessed. Such collection parameters for the collection model 210 may be obtained from asset specifications such as WINDOWS MANAGEMENT INSTRUMENTATION (WMI) for MICROSOFT WINDOWS. As another example, if an asset 205 is an EXPE-RION server by HONEYWELL INTERNATIONAL INC., there are various known types of collection parameters that can be determined. Together, the collection parameters for each type of asset 205 make up the collection model 210.

The applications 215 represent one or more executable software or firmware applications that use health or performance data "streamed" (transmitted or otherwise sent) to the applications 215 on a regular or other basis. In many cases, the applications 215 are utility applications associated with a monitoring and reporting system or asset health in order to ensure optimal performance of a system. As a particular example, one application 215 can be the WINDOWS PERFORMANCE MONITOR by MICROSOFT. Other applications 215 may include customized applications specifically developed for a particular company, enterprise, customer, plant, control system, asset, or asset group. In some cases, an application 215 can include a financial component that measures financial impacts based on performance and health of company or system assets. In general, the applications 215 can include any suitable application that uses health or performance data of assets during operation.

The policies 220 represent one or more policies or rules that govern, drive, or restrict the collection, distribution, and usage of data. For example, some applications 215 may execute on a cloud-based computer or server. For security reasons, there can be a policy 220 that certain types of performance or health information and data will not be sent to an application 215 that operates in a cloud environment. The policies 220 can be predefined, customized, or developed from scratch on-site. That is, depending on system requirements, an enterprise or plant can use one or more predefined policies 220 without modification, customize one or more predefined policies 220 for particular system requirement(s), develop one or more policies 220 from scratch, or any combination of these. The policies 220 are optional, meaning some enterprises may have no policies 220 that affect the generation of the schedule 225. Further details regarding use of policies 220 are described with respect to FIG. 3 discussed below.

The schedule 225 represents a collection schedule indicating the health or performance data that is collected from various assets 205, when and how often the data is collected, and to which applications 215 the health or performance data is provided. The schedule 225 is generated according to the framework 200 by cross-referencing the information of the assets 205 and the collection model 210 with the applications 215 and, optionally, the policies 220.

In some embodiments, the framework 200 generally operates in two stages within a target control system, such as the system 100. The first stage includes initial installation and periodically following of any changes in the assets (such as a plant equipment change). During the first stage, an asset discovery operation is performed to discover the assets 205. This may include execution of an asset discovery utility on the computing device 230 or other computing device(s) connected to a network. The asset discovery utility searches out computers, controllers, network switches, and any other assets 205, determines the functionality of each asset 205, and records the assets 205 in a database 235 or other data store.

During the second stage, the collection model 210 is cross-referenced with each asset 205 based on the functions discovered for that asset 205. This identifies what data or information could be collected from the assets 205. That is, using the information about the assets 205 and the collection model 210, the framework 200 can identify the data points that could be collected from the assets 205. The information that could be collected is then cross-referenced with the requirements of the applications 215 that use such data or information and, optionally, the policies 220 that govern data usage to identify what data or information should actually be collected.

In particular embodiments, a process for using the framework 200 is as follows. First, the computing device 230 is installed at a site that is accessible to a plant operator. The computing device 230 represents any suitable computing device capable of processing data and communicating with other computing devices over one or more networks. The computing device 230 can represent, or be represented by, one or more of the operator stations 116, 124, 132, 140 or the historian 141 of FIG. 1. In some cases, the computing device 230 may be installed in a cloud environment and may be accessed by the plant operator over a local area network (LAN), wide area network (WAN), virtual private network (VPN), or other network connection. The collection model 210 can then be installed for use by the computing device 230. This can include storing the collection model in the database 235. In some embodiments, the database 235 may represent a relational database or other data storage space disposed in a memory of the computing device 230 or in another device communicatively coupled to the computing device 230, such as via a bus or a network connection.

Later, assets 205 may be discovered and entered into the database 235 via one or more asset discovery processes. This may include using ACTIVE DIRECTORY for MICROSOFT WINDOWS or querying an EXPERION server to determine what controllers are connected to the EXPERION server. Together, the assets 205 and the collection model 210 provide collectable information of the plant or system. At some point, one or more applications 215 are installed to be in communication with the plant or system. Each application 215 may require or use information from one or more assets 205. Information from each application 215 may also be stored in the database 235.

If an asset 205 is indicated as an asset from which information may be needed, a data collection application 240 (also referred to as an "app") can be installed on the asset 205 to manage the collection of data from that asset. The app 240 communicates with the computing device 230 in order to determine (i) what information from the asset 205 should be collected by the app 240 and sent to the computing device 230 and (ii) when and how often the information is required or requested. This communication can occur in any suitable manner, such as through a web application programming interface (API) or other suitable communication protocol. The computing device 230 can respond to the app 240 with all or portions of the collection schedule 225 for collecting particular information at particular times. This can be done automatically. In some embodiments, while the computing device 230 determines the schedule 225, the schedule 225 may not be stored at the computing device 230. Instead, the schedule 225 can be stored at the assets 205. In other embodiments, the schedule 225 could be maintained at the computing device 230.

Although FIG. 2 illustrates one example of a framework 200 for automatic configuration of a data collection system and schedule for control system monitoring, various changes may be made to FIG. 2. For example, components could be added, omitted, combined, further subdivided, or placed in any other suitable configuration according to particular needs. Also, system frameworks can come in a variety of configurations, and FIG. 2 does not limit this disclosure to any particular configuration of framework.

The framework 200 provides a generalized framework that facilitates collection of asset data from many different sources. Because the framework 200 is generalized and flexible, it can be necessary to customize the framework 200 to adhere to specific policies or rules (such as the policies 220) that address the collection, storage, and use of disparate types of asset data. The policies are typically based on the type or "classification" of the data in question.

"Classification" of data addresses what the data is related to. Examples of different classifications of data can include financial data, personal data, process system and operational data (e.g., tank level, temperature, production outputs, etc.), inventory data, and the like. Some data can have multiple classifications. For example, production output of an industrial process control system could be operational data as a measure of the production system's performance, but also financial data in that the output can represent an asset with an economic value. Each of the different classifications of data can trigger different policies or rules in how the data is collected, stored, presented, and processed. Such policies can be company-specific, industry-specific, geography-specific, or the like. Some policies can address security or legal considerations, such as who can see the data, whether or not the data can be transmitted to certain geographical or functional locations, and the like.

For example, some companies or corporate entities may have one or more information security policies that govern which employees have access to certain types of data. As another example, some geographical or political jurisdictions have one or more policies that affect collection and storage of data. As a specific example, "personal data" is defined in many legal jurisdictions with respect to certain types of data uniquely associated with an individual person. In Europe, there are legal restrictions as to what a company can do with "personal data," such as where the personal data can be stored. For example, if a company with European operations stores personal data in a database server located in Europe and wants to geo-replicate the data in a North American server, the company may be in violation of certain European laws governing the storage of personal data.

While it would be possible to classify data as it is collected using the framework 200, or even after the data is collected and stored, it is advantageous to have a predefined classification for different types of data before the collection process occurs. This ensures that the data collection process performed by the framework 200 is performed with improved accuracy and speed. For example, if certain types of data are pre-classified, then the framework 200 will know how to collect and store the data (or even know to not collect or store the data) according to one or more of the policies 220 when data of this type is encountered. This can ensure, for example, that the framework 200 does not transmit sensitive data to the wrong place.

As a particular example, based on data classification and a policy 220 for that classification, security for certain classifications of data can be segmented, e.g., who has access to what types or classes of data. As another particular example, if the classification is "desktop computer," various policies can be defined for collection of CPU utilization, used and available storage, etc. In addition to data collection and storage, the predefined classifications can also guide other data analytics and operations that may be performed, such as sorting, filtering, limit checking, and alarm generation.

In some embodiments, the classification is a metadata tag that can be attached to and stored with the data so that the data can be readily processed according to some policy.

When data belongs to more than one classification, then multiple tags can be attached to the data.

Figure 3:
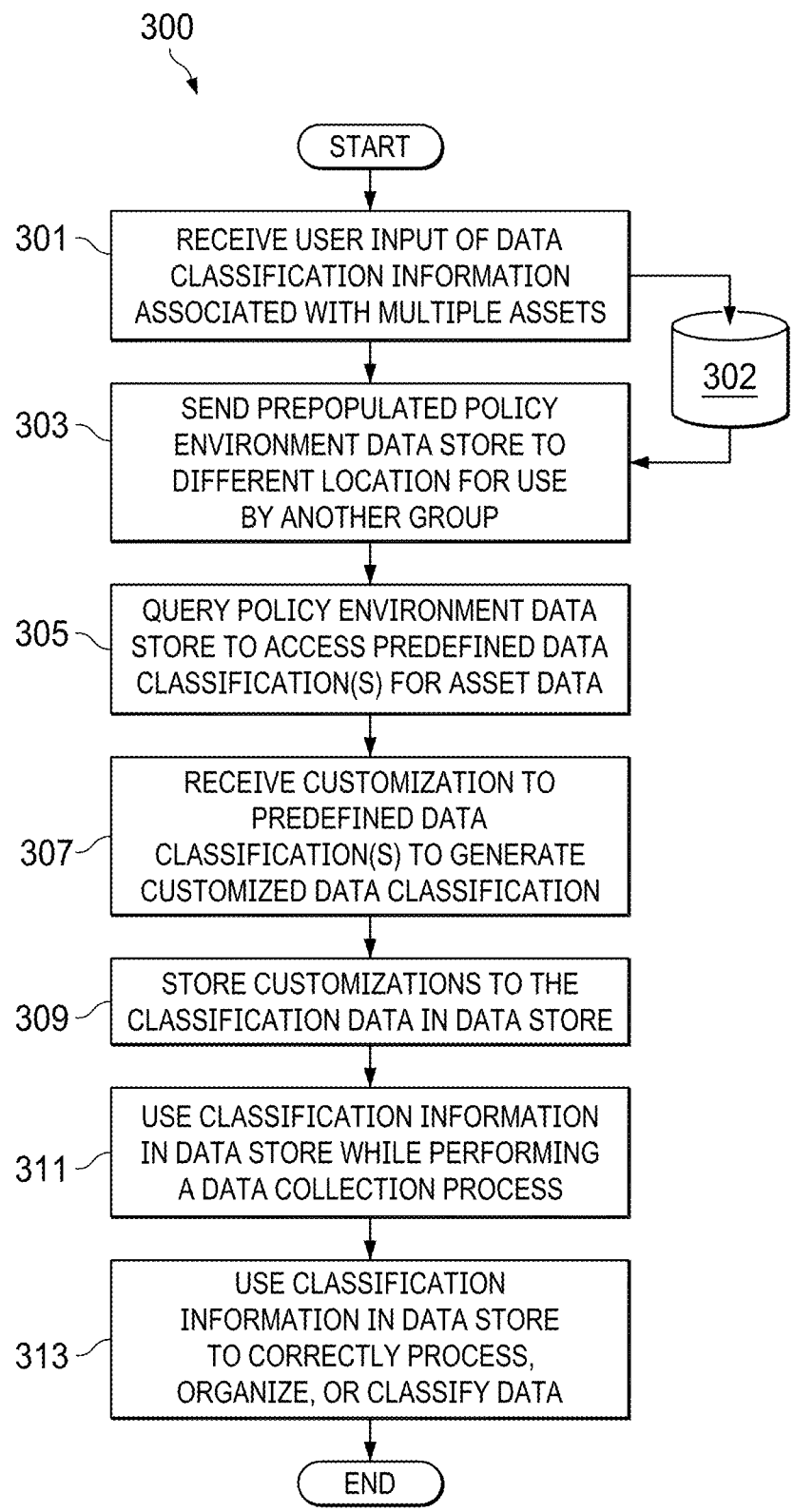
FIG. 3 illustrates an example method for classification of data types for use with a data collection system associated with control system monitoring, according to this disclosure.

FIG. 3 illustrates an example method 300 for classification of data types for use with a data collection system associated with control system monitoring, according to this disclosure. For ease of explanation, the method 300 is described as being performed using one of the operator stations 116, 124, 132, 140 of FIG. 1 or the computing device 230 of FIG. 2. However, the method 300 could be used with any suitable device or system.

At step 301, a computing device receives user input of data classification information associated with multiple assets in accordance with one or more policies. This may include, for example, a user (e.g., a data administrator, engineer, or management personnel) entering, updating, or maintaining data classifications for asset data and associating the data classifications with one or more policies 220 that have rules, restrictions, etc., related to the data classifications. The information is stored in a data storage, such as the database 235. (As used herein, the term "database" can include data stores other than a relational database. For example, a database can include one or more flat files.) As a particular example, the user may determine that "boiler temperature" should have an "operational data" classification that is subject to a particular data retention policy, due to regulatory requirements. The user can use a graphical user interface to generate a database record that links the asset data "boiler temperature" and its classification "operational data." The user can also define and maintain one or more data retention policies associated with the classification "operational data."

Later, the user can enter, update, or maintain data classifications for other types of asset data. As discussed above, the asset data can be associated with many types of assets (e.g., the assets 205), and the classifications can include multiple classifications, including financial data, operational data, personal data, and the like. The user can set or associate various policies 220 with each classification; such policies 220 can include predefined actions or limits based on this classification (e.g., What data is collected? Where can the collected data be stored? Who can view or edit the collected data? Should the collected data be encrypted? How long will the data be kept? Should the data be sent to a cloud network? Can the data be visible to first-level employees?). The policies 220 could include various types of policies, including corporate policies, legal policies, regulatory policies, industry standards, regional or geographical customs, and the like. Ultimately, a "policy environment" database 302 is created that defines the policies and rules for different classifications of asset data.

At step 303, a computing device sends the prepopulated policy environment database 302 to a different location for use by another group. For example, in some embodiments, a vendor prepopulates the policy environment database 302 and shares the database 302 with one or more customers. The policy environment database 302 could be included as part of a data collection solution (e.g., the framework 200) provided by the vendor to a customer. (As used herein, a vendor can refer to an entity that provides hardware, software, consulting, and/or information services to another entity. In some embodiments, a vendor can include an OEM, a third-party partner, and the like. For example, HONEYWELL INTERNATIONAL INC. or one its divisions could be considered a vendor to its customers. As another example, third-party services groups that partner with HONEYWELL INTERNATIONAL INC. could be considered a vendor to HONEYWELL's customers.) The policy environment database 302 allows the customers to take advantage of the predefined data classifications and policies as the customer sets up the customer's data collection solution. In other embodiments, the policy environment database 302 may be prepopulated by a central business group of a large organization and then distributed to different divisions within the organization.

At step 305, a computing device queries the policy environment database 302 to access at least one predefined data classification for asset data associated with multiple assets. The predefined data classification(s) are associated with one or more policies 220. In some embodiments, the assets may be assets in an industrial process control system. In this step, the computing device may be a computing device of an end user, such as a customer's computing device or a computing device in a division of an organization. The policy environment database 302 is queried in preparation for customizations to classifications stored in the database 302.

At step 307, a computing device receives user input of a customization to predefined data classification(s) to generate at least one customized data classification associated with one or more policies 220. This may include a user (e.g., a customer, data administrator, engineer, or management personnel) updating or maintaining existing data classifications in the database 302, adding new classifications to the database 302, or deleting existing data classifications in the database 302. In particular, the user can review the predefined classifications and policies in the database 302 and can then implement them as they exist or make changes or customizations as needed.

At step 309, a computing device stores the customizations to the classification data from step 307 in the database 302.

At step 311, a computing device (e.g., a computing device executing the data collection app 240) uses the classification information in the database 302 while performing a data collection process. The classification information can impact the data collection process in a variety of ways. For example, in some cases, the classification of certain data (e.g., secured or confidential data) may include a policy that the data should not be collected at all. In such a case, when the computing device encounters data with this classification, the computing device knows to avoid the data and not collect it.

At step 313, after data is collected using the collection process in step 311, one or more applications that make use of the collected data could also use the classification information in the policy environment database 302 in order to correctly process, organize, or classify the data.

Although FIG. 3 illustrates one example of a method 300 for classification of data types for use with a data collection system associated with control system monitoring, various changes may be made to FIG. 3. For example, while shown as a series of steps, various steps shown in FIG. 3 could overlap, occur in parallel, occur in a different order, or occur multiple times. Moreover, some steps could be combined or removed and additional steps could be added according to particular needs.

Figure 4:
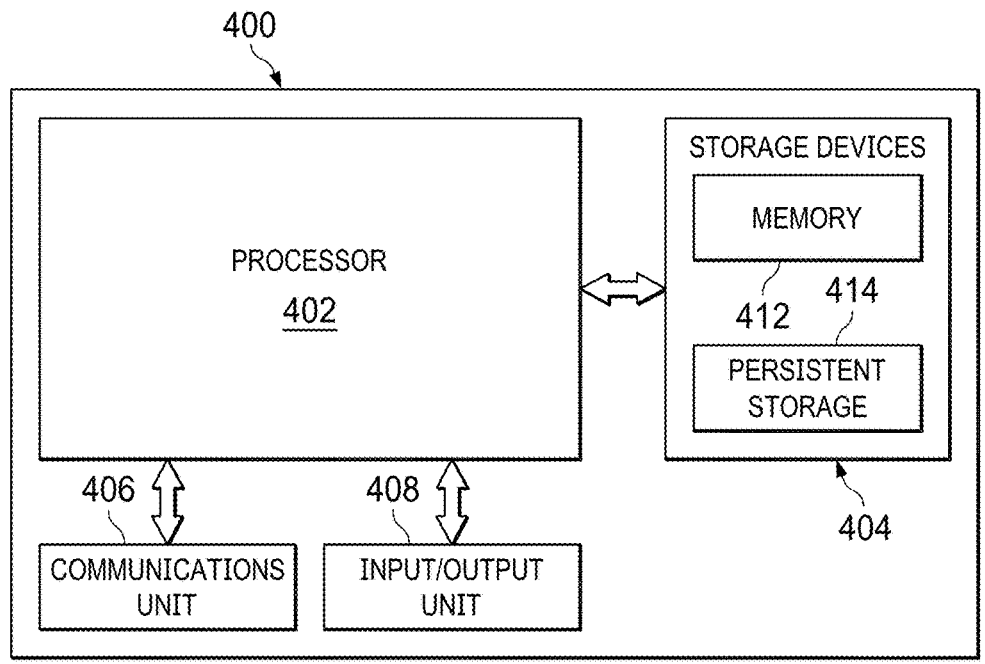
FIG. 4 illustrates an example device supporting classification of data types for use with a data collection system associated with control system monitoring, according to this disclosure.

FIG. 4 illustrates an example device 400 supporting classification of data types for use with a data collection system associated with control system monitoring, according to this disclosure. The device 400 could, for example, represent the computing device 230 of FIG. 2 or one of the operator stations 116, 124, 132, 140 of FIG. 1. However, the computing device 230 and the operator stations 116, 124, 132, 140 could be implemented using any other suitable device or system, and the device 400 could be used in any other suitable system.

As shown in FIG. 4, the device 400 includes at least one processor 402, at least one storage device 404, at least one communications unit 406, and at least one input/output (I/O) unit 408. Each processor 402 can execute instructions, such as those that may be loaded into a memory 412. Each processor 402 denotes any suitable processing device, such as one or more microprocessors, microcontrollers, digital signal processors, application specific integrated circuits (ASICs), field programmable gate arrays (FPGAs), or discrete circuitry.

The memory 412 and a persistent storage 414 are examples of storage devices 404, which represent any structure(s) capable of storing and facilitating retrieval of information (such as data, program code, and/or other suitable information on a temporary or permanent basis). The memory 412 may represent a random access memory or any other suitable volatile or non-volatile storage device(s). The persistent storage 414 may contain one or more components or devices supporting longer-term storage of data, such as a read only memory, hard drive, Flash memory, or optical disc. In accordance with this disclosure, the memory 412 and persistent storage 414 may be configured to store information and data associated with classification of data types for use with a data collection system, such as the framework 200 of FIG. 2.

The communications unit 406 supports communications with other systems or devices. For example, the communications unit 406 could include a network interface card or a wireless transceiver facilitating communications over a wired or wireless network (such as any of the networks 104, 108, 112, 120, 128, 136). The communications unit 406 may support communications through any suitable physical or wireless communication link(s).

The I/O unit 408 allows for input and output of data. For example, the I/O unit 408 may provide a connection for user input through a keyboard, mouse, keypad, touchscreen, or other suitable input device. The I/O unit 408 may also send output to a display, printer, or other suitable output device.

Although FIG. 4 illustrates one example of a device 400 supporting classification of data types for use with a data collection system associated with control system monitoring, various changes may be made to FIG. 4. For example, various components in FIG. 4 could be combined, further subdivided, or omitted and additional components could be added according to particular needs. Also, computing devices can come in a wide variety of configurations, and FIG. 4 does not limit this disclosure to any particular configuration of computing device.

As discussed herein, the disclosed embodiments provide a number of advantages over conventional systems that do not support automatic data classification. For example, the disclosed embodiments increase the accuracy and decrease the resources required for configuration of asset metadata that must be entered. This also helps to reduce costs incurred during configuration period, and makes the configured system available more quickly after configuration.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving a user input of at least one predefined data classification associated with multiple assets in an industrial process control system, in accordance with one or more first policies, the multiple assets residing in a collection environment, wherein the one or more first policies includes: rules and restrictions, the one or more first policies indicative of how data is collected, stored, presented, and processed and related to the multiple assets in the industrial process control system, wherein the rules and restrictions restrict a collection of the data, a distribution of the data, and a usage of the data based on types of performance information and health information of the multiple assets in the industrial process control system, wherein the collection, the distribution and the usage of the data is based on a schedule indicating the performance information and the health information collected from the multiple assets, the schedule generated according to a framework by cross-referencing the performance information and the health information of the multiple assets and a collection model with applications of the framework, wherein the schedule represents a collection schedule indicative of when and how often the data is collected based on when and how the data is required or requested, wherein the collection of the data is associated with a data model defining asset attributes comprising collection parameters that are known how to collect, wherein the defined asset attributes are arranged and categorized based on an asset type of the multiple assets in the industrial process control system wherein the framework operates in two stages within a target control system, wherein a first stage of the two stages an asset discovery operation is performed to discover the multiple assets and wherein a second state of the two stages, the cross-referencing involves the data model cross-referenced with each asset among the multiple assets based on the functions discovered for the each asset;

in response to the received user input, accessing, by at least one processing device from a data store, the at least one predefined data classification for the data associated with the multiple assets in the industrial process control system, wherein the at least one predefined data classification is associated with the one or more first policies, and wherein the data store stores a plurality of data classifications for asset data;

in response to the accessing, receiving, by the at least one processing device, user input of a customization to the at least one predefined data classification to generate at least one customized data classification associated with one or more second policies;

storing, by the at least one processing device, the at least one customized data classification in the data store, after receiving the user input of the customization to the at least one predefined data classification;

in response to the storing, collecting, by the at least one processing device, the data from at least one of the multiple assets; and in response to the collecting, processing, by the at least one processing device, the collected data according to the one or more second policies associated with the at least one customized data classification.

2. The method of claim 1, wherein the data store is received from a vendor before the at least one predefined data classification is accessed from the data store.

3. The method of claim 2, wherein the data store is prepopulated by the vendor before the data store is received from the vendor.

4. The method of claim 1, wherein collecting the asset data from at least one of the multiple assets comprises collecting the asset data in accordance with at least one of the data classifications stored in the data store.

5. The method of claim 1, wherein the predefined and customized data classifications comprise financial data, personal data, and inventory data.

6. The method of claim 5, wherein the first and second policies comprise: a legal policy, a regulatory policy, an industry standard, and a regional custom and a geographical custom.

7. The method of claim 1, wherein the user input of the customization to the at least one predefined data classification is received at a graphical user interface controlled by the at least one processing device.

8. An apparatus comprising:
at least one processing device configured to:
receive a user input of at least one predefined data classification associated with multiple assets in an industrial process control system, in accordance with one or more first policies, the multiple assets residing in a collection environment, wherein the one or more first policies includes: rules and restrictions, the one or more first policies indicative of how data is collected, stored, presented, and processed and related to the multiple assets in the industrial process control system, wherein the rules and restrictions restrict a collection of the data, a distribution of the data, and a usage of the data based on types of performance information and health information of the multiple assets in the industrial process control system, wherein the collection, the distribution and the usage of the data is based on a schedule indicating the performance information and the health information collected from the multiple assets, the schedule generated according to a framework by cross-referencing the performance information and the health information of the multiple assets and a collection model with applications of the framework, wherein the schedule represents a collection schedule indicative of when and how often the data is collected based on when and how the data is required or requested, wherein the collection of the data is associated with a data model defining asset attributes comprising collection parameters that are known how to collect, and wherein the defined asset attributes are arranged and categorized based on an asset type of the multiple assets in the industrial process control system, wherein the framework operates in two stages within a target control system, wherein a first stage of the two stages an asset discovery operation is performed to discover the multiple assets and wherein a second state of the two stages, the cross-referencing involves the data model cross-referenced with each asset among the multiple assets based on the functions discovered for the each asset;

in response to the received user input, access, from a data store, the at least one predefined data classification for the data associated with the multiple assets in the industrial process control system, wherein the at least one predefined data classification is associated with the one or more first policies, and wherein the data store stores a plurality of data classifications for asset data;

in response to the access to the data store, receive user input of a customization to the at least one predefined data classification to generate at least one customized data classification associated with one or more second policies;

store the at least one customized data classification in the data store after the user input of the customization to the at least one predefined data classification is received;

collect asset data from at least one of the multiple assets after the at least one customized data classification is stored in the data store; and in response to the collection of the asset data, process the collected data according to the one or more second policies associated with the at least one customized data classification.

9. The apparatus of claim 8, wherein the data store is received from a vendor before the at least one predefined data classification is accessed from the data store.

10. The apparatus of claim 9, wherein the data store is prepopulated by the vendor before the data store is received from the vendor.

11. The apparatus of claim 8, wherein to collect the asset data from the at least one asset, the at least one processing device is configured to collect the asset data in accordance with at least one of the data classifications stored in the data store.

12. The apparatus of claim 8, wherein the predefined and customized data classifications comprise financial data, personal data, and inventory data.

13. The apparatus of claim 8, wherein the first and second policies comprise at least one of: a legal policy, a regulatory policy, an industry standard, and a regional custom or a geographical custom.

14. The apparatus of claim 12, wherein the user input of the customization to the at least one predefined data classification is received at a graphical user interface controlled by the at least one processing device.

15. A non-transitory computer readable medium containing instructions that, when executed by at least one processing device, cause the at least one processing device to:

receive a user input of at least one predefined data classification associated with multiple assets in an industrial process control system, in accordance with one or more first policies, the multiple assets residing in a collection environment, wherein the one or more first policies includes: rules and restrictions, the one or more first policies indicative of how data is collected, stored, presented, and processed and related to the multiple assets in the industrial process control system, wherein the rules and restrictions restrict a collection of the data, a distribution of the data, and a usage of the data based on types of performance information and health information of the multiple assets in the industrial process control system, wherein the schedule represents a collection schedule indicative of when and how often the data is collected based on when and how the data is required or requested, wherein the collection of the data is associated with a data model defining asset attributes comprising collection parameters that are known how to collect, and wherein the defined asset attributes are arranged and categorized based on an asset type of the multiple assets in the industrial process control system, wherein the framework operates in two stages within a target control system, wherein a first stage of the two stages an asset discovery operation is performed to discover the multiple assets and wherein a second state of the two stages, the cross-referencing involves the data model cross-referenced with each asset among the multiple assets based on the functions discovered for the each asset;

in response to the received user input, access, from a data store, the at least one predefined data classification for the data associated with the multiple assets in the industrial process control system, wherein the at least one predefined data classification is associated with the one or more first policies, and wherein the data store stores a plurality of data classifications for asset data;

in response to the access to the data store, receive user input of a customization to the at least one predefined data classification to generate at least one customized data classification associated with one or more second policies;

store the at least one customized data classification in the data store after the user input of the customization to the at least one predefined data classification is received;

collect asset data from at least one of the multiple assets after the at least one customized data classification is stored in the data store; and in response to the collection of the asset data, process the collected data according to the one or more second policies associated with the at least one customized data classification.

16. The non-transitory computer readable medium of claim 15, wherein the data store is received from a vendor before the at least one predefined data classification is accessed from the data store.

17. The non-transitory computer readable medium of claim 16, wherein the data store is prepopulated by the vendor before the data store is received from the vendor.

18. The non-transitory computer readable medium of claim 15, wherein the instructions to collect the asset data from at least one of the multiple assets comprise instructions to collect the asset data in accordance with at least one of the data classifications stored in the data store.

19. The non-transitory computer readable medium of claim 15, wherein the predefined and customized data classifications comprise at least one of: financial data, personal data, and inventory data.

20. The non-transitory computer readable medium of claim 19, wherein the first and second policies comprise at least one of: a legal policy, a regulatory policy, an industry standard, and a regional custom or a geographical custom.

* * * * *